UNITED STATES PATENT OFFICE.

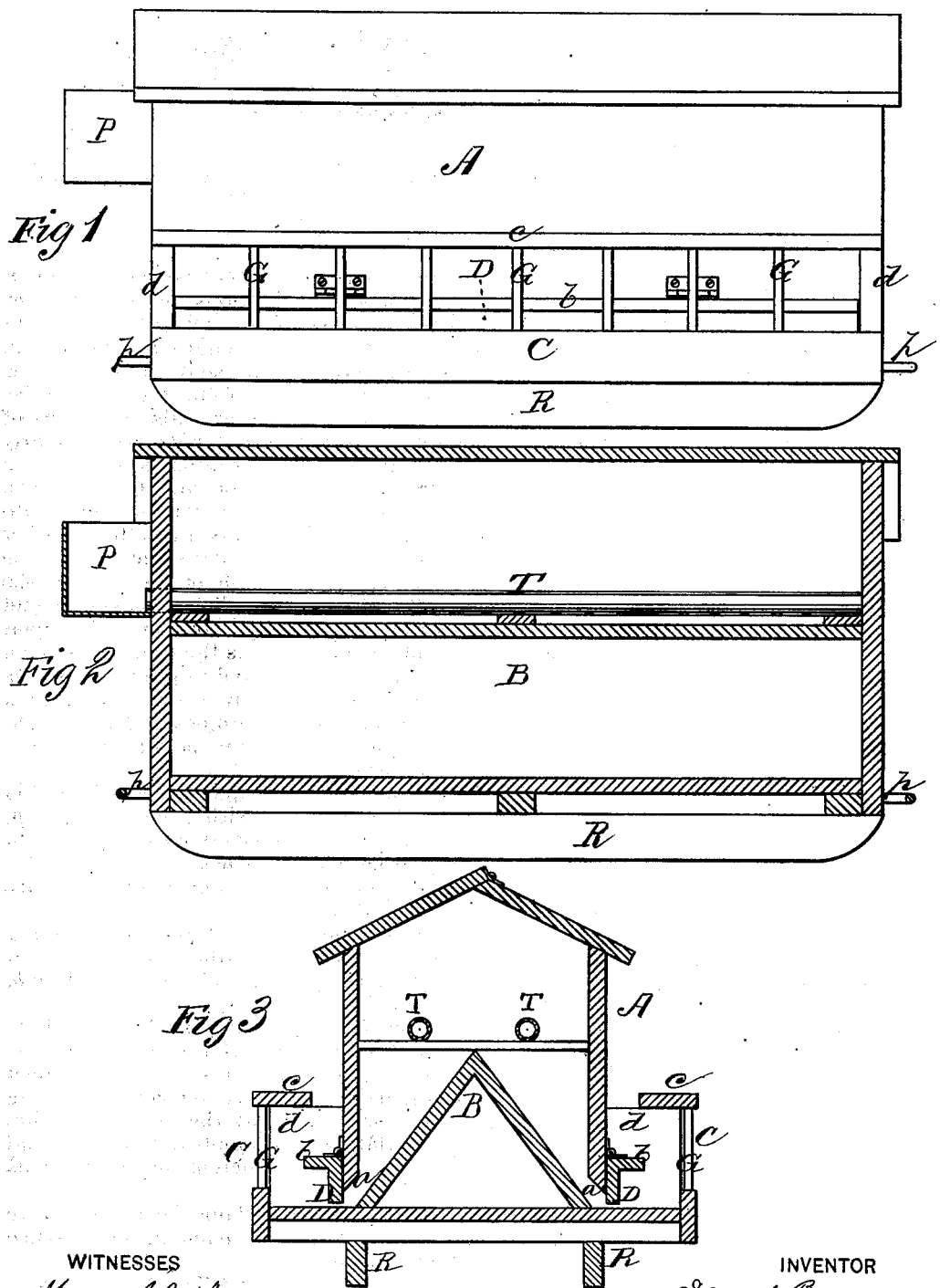

SAMUEL BRYAN, OF TWIN GROVE, WISCONSIN.

IMPROVEMENT IN HOG-FEEDERS.

Specification forming part of Letters Patent No. 198,564, dated December 25, 1877; application filed October 20, 1877.

*To all whom it may concern:*

Be it known that I, SAMUEL BRYAN, of Twin Grove, in the county of Green and State of Wisconsin, have invented a new and valuable Improvement in Combined Self Feeders and Soakers for Hogs; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a front view of this invention. Fig. 2 is a longitudinal vertical section. Fig. 3 is a cross-section.

This invention has relation to improvements in bins for feeding hogs.

The nature of the invention consists in combining, with a bin having a longitudinal dividing-ridge for shedding the food to each side into the trough, of gravitating-doors having a nose-ledge, whereby the hogs are able to raise the door when the said troughs are empty, and allow feed to run down into the same.

It also consists in the combination, with the bin of the feeder and its angular dividing-ridge, of a series of perforated distributing-pipes, located over each inclined side of said dividing-ridge, and communicating with a reservoir at the end of the bin, whereby the food is supplied to the bin and properly distributed therein.

In the annexed drawings, the letter A designates an oblong bin, covered by a gable-roof, one of the sides of which may be raised to put in the feed, and provided with a longitudinal angular ridge, B, which delivers the feed to both sides of the bin, whence it falls through the openings $a$ into the troughs C at each side. The openings $a$ are closed by gravitating-doors D, having each a horizontal ledge, $b$, rooting under which, in their efforts to get at the grain in the bin, the hogs will raise the said doors when the troughs are empty, and cause a fresh supply to be delivered into the troughs. These doors may be made in two or more independent sections, or in one piece, extending from end to end of the bin. As shown in Fig. 3, the troughs are covered in at the top and sides, as shown at $c$ and $d$, respectively, and open in front, this opening being divided into feeding-stalls by means of metallic rods G. These rods are regularly spaced, and prevent the animals, while being fed, from crowding upon and fighting each other, and from getting partly or wholly into the troughs. P represents a metallic or other reservoir, rigidly secured to one end of the bin, having at each side of the apex of the ridge B a pipe, T, extending from end to end of said bin. These pipes are perforated upon their under sides, and as the grain falls down the incline to be delivered to the troughs, it is moistened or soaked by water flowing from the reservoir through the pipes, and discharged into the bin through the perforations upon their under sides.

The bin is mounted upon runners R, and is provided at each end with a clevis-staple, $p$, to which a team may be attached, and the bin carried from place to place.

What I claim as new, and desire to secure by Letters Patent, is—

1. The combination, with the bin A, having the dividing-ridge B and the troughs C, of the gravitating-doors D, having the nose-ledge $b$, substantially as specified.

2. In combination with the bin A and its angular dividing-ridge B, the perforated distributing-pipes T, located over each inclined side of said dividing-ridge, and communicating with a reservoir, P, at the end of the bin, whereby the food is supplied to the bin and properly distributed therein, substantially as specified.

In testimony that I claim the above I have hereunto subscribed my name in the presence of two witnesses.

SAMUEL BRYAN.

Witnesses:
    B. F. CARLE,
    JOHN SWAN.